United States Patent [19]
Levi et al.

[11] Patent Number: 4,787,299
[45] Date of Patent: Nov. 29, 1988

[54] DETECTION AND DISPLAY DEVICE FOR AUTOMATIC SERVICE EXPRESSO COFFEE MACHINE

[76] Inventors: Mario Levi, "Les Lavandes" 90 AV. de la Lanterne; Jean-Pierre Levi, Résid. Isola Celesta - Bat C - Rez de Jardin "L'Ithaque" 4 Corniche Fleurie, both of F-06200 Nice, France

[21] Appl. No.: 153,924

[22] Filed: Feb. 9, 1988

[30] Foreign Application Priority Data

Feb. 11, 1987 [FR] France ............... 87 01801

[51] Int. Cl.[4] .............. A47J 31/42; A47J 31/00
[52] U.S. Cl. .................... 99/285; 99/286; 99/295
[58] Field of Search ............ 99/279, 280, 281, 282, 99/283, 285, 286, 289 R, 295; 426/433

[56] References Cited

U.S. PATENT DOCUMENTS

| | | | |
|---|---|---|---|
| 4,242,568 | 12/1980 | Gurtner | 99/280 |
| 4,412,481 | 11/1983 | Oota | 99/285 |
| 4,551,611 | 11/1985 | Longo | 99/285 |
| 4,572,060 | 2/1986 | Yung-Kuan | 99/285 |
| 4,665,808 | 5/1987 | Pulvermuller | 99/285 |
| 4,745,852 | 5/1988 | Sager | 99/280 |

FOREIGN PATENT DOCUMENTS

| | | |
|---|---|---|
| 1209257 | 1/1966 | Fed. Rep. of Germany . |
| 2048163 | 4/1972 | Fed. Rep. of Germany . |
| 1069975 | 7/1954 | France . |
| 1156557 | 5/1958 | France . |
| 1334489 | of 1963 | France . |
| 1476354 | 4/1967 | France . |
| 2522951 | 9/1983 | France . |
| 2538103 | 6/1984 | France . |
| 631613 | 8/1982 | Switzerland . |

Primary Examiner—Robert W. Jenkins
Attorney, Agent, or Firm—Cushman, Darby & Cushman

[57] ABSTRACT

The invention concerns a detection and display device for automatic service expresso coffee machine which automatically outputs and displays water or ground coffee doses according to the capacity of the filter-holder bowl engaged on the bowl-holder of the coffee machine.

Detection and display are obtained by means of an actuator-detector system generating electric signals, such as one or more magnetic elements (5) mounted on filter-holder bowl (1) and a Hall effect detector (A) mounted on bowl-holder (11) of the coffee grinder or coffee machine.

9 Claims, 7 Drawing Sheets

DETECTION AND DISPLAY DEVICE FOR AUTOMATIC SERVICE EXPRESSO COFFEE MACHINE

BACKGROUND OF THE INVENTION

1. Field of the invention

The invention concerns a detection and display device for automatic service expresso coffee machines which automatically outputs and displays the number of ground coffee doses or the number of water doses required for the infusion phase depending on the capacity of the filter-holder bowl engaged on the coffee grinder or coffee machine bowl-holder.

In bars, drugtores, self-service counters, restaurant chains, etc., there are presently coffee machines designed to satisfy expresso coffee and coffee demands with variable strengths. They are generally machines which impose certain constraints on the operator as regards the commands, resulting in a loss of time, poor conditions of use and risks or errors which do not guarantee the required quality of infusion of the coffee. In effect, the operator can inadvertently press a water dose selection key on the ergonomic keypad which does not correspond to the quantity of coffee in the filter-holder bowl engaged on the bowl-holder of the expresso coffee machine, which can in certain cases result in overflow of the coffee, with the ensuing wastage.

2. Background Art

Water metering devices already exist for expresso coffee machines. They use a Hall effect detector with a body, a cavity formed in the body and closed by a cover, a rotor mounted in the cavity on the edge of which is embedded at least one magnetic part and a Hall effect detector mounted in a position opposite the path of the embedded part. These devices, used as flowmeters, do not cater for the above situation but can, however, be used to supplement the device subject of this invention.

SUMMARY OF THE INVENTION

The device according to the invention is aimed at overcoming these drawbacks.

This invention, as it is characterized, solves the problem consisting of providing expresso coffee machines with a device which displays the number of cups corresponding to the capacity of the filter-holder bowl (1, 2 or 3 cups) when the filter-holder bowl is engaged on one of the bowl-holders of said machine, then, in manual mode, dispensing of the amount of water corresponding to the number of small or large cups selected or, in automatic mode, delayed dispensing of the water coresponding to the number of small or large cups preselected.

The detection and display device for automatic service expresso coffee machines which automatically outputs and displays the number of ground coffee doses or water doses corresponding to the required infusion quantity, depending on the capacity of the filter-holder bowl engaged on the bowl-holder of the coffee grinder or coffee machine, is mainly characterized by the fact that automatic detection and display of the number of ground coffee or water doses, according to the capacity of the filter-holder bowl, are obtained by means of an actuator mounted on the filter-holder bowl and a detector mounted on the bowl-holder of the coffee grinder or coffee machine.

The actuator and detector form a system generating electric signals the number of which corresponds to the capacity in cups of the filter-holder bowl engaged on the bowl-holder.

In a first embodiment of the invention, the actuator-detector system consists of bars traced on the edge of the filter-holder bowl and a bar code reader mounted on the bowl-holder or body of the machine.

In a second embodiment of the invention, the actuator-detector system consists of a color pad mounted on the filter-holder bowl and a color detector mounted on the bowl-holder or machine body.

In a preferred embodiment of the invention, the actuator and detector are made of one or more magnetic elements mounted on the filter-holder bowl and a Hall effect detector mounted on the bowl-holder respectively.

The magnetic element(s) mounted on the filter-holder bowl are inserted in one or more cavities provided on the edge of one of the filter-holder bowl mounting ears. The number of cavities and magnetic elements mounted on the filter-holder bowl correspond to the number of outlets of the distribution nozzle on the filter-holder bowl.

The Hall effect detector is installed radially on the bowl-holders of the coffee grinder at an angle and in a position such that it is scanned by the magnetic element(s) on the filter-holder bowls when the bowls are engaged.

Display of the number of cups corresponding to the capacity of the filter-holder bowl engaged on the bowl-holder is obtained by means of an electronic display.

The number of water doses corresponding to the capacity of the filter-holder bowl engaged and the desired coffee strength is obtained by means of an electronic circuit controlled by strength selection keys connecting the detector to the water metering system. This electronic circuit mainly consists of an amplifier, a signal converter, a counter, a decoder, a readout and a comparator.

The coffee machine control keypad includes the electronic readout, the two strength selection keys, a continuous operation control key and a manual or automatic operation key. All the keys are surmounted by an operation indicator light.

The advantages provided by this invention mainly consist of fully relieving the user of the choice of the bowl-holder and selection of the water doses corresponding to the capacity of the filter-holder bowl. The only action of the user then consists of setting the coffee strength (small cup or large cup) and checking the digital readout to make sure that the filter-holder bowl is correctly chosen (1, 2 or 3 cups) before initiating the infusion phase.

Other characteristics and advantages will appear in the description of the preferred embodiment of the invention given below, mounted on an expresso coffee machine to dispense water doses, given as a nonrestrictive example, with reference to the attached drawings

DESCRIPTION OF THE PREFERRED EMBODIMENTS

Figure 1:
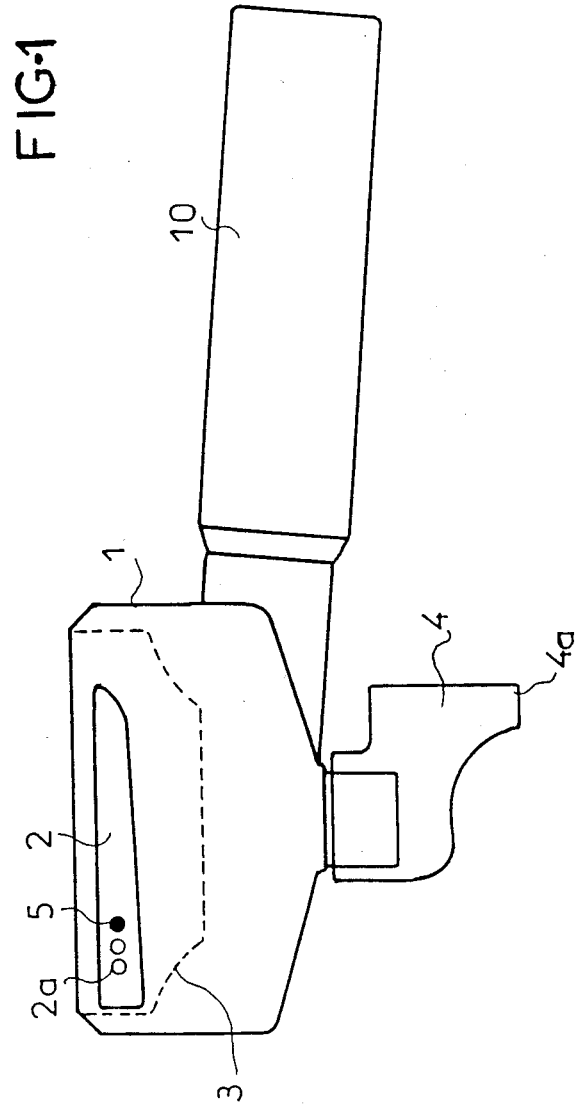
FIG. 1 shows the side view of a "1-cup" filter-holder bowl assembly according to the invention

FIGS. 1 to 6 show a detection and display device for automatic service expresso machines which automatically outputs and displays the number of ground coffee or water doses required for the infusion phase depending on the capacity of the filter-holder bowl engaged on bowl-holder 11. This device mainly consists of at least one magnetic element 5 embedded in at least one hole 2a drilled in the edge of one of the lateral ears 2 of filter-holder bowl 1 and a Hall effect detector A mounted on the edge of bowl-holder 11 in an angular position such that it is scanned by holes 2a when filter-holder bowl 1 is rotated in bowl-holder 11 by handle 10, allowing, when the filter-holder bowl is engaged, the water metering device electronic control system to read the number of cups requested so as to deliver the corresponding doses when the user presses small cup key 11 or large cup key 12 and control key 13 on control keypad 15 including digital readout 14 indicating the number of cups corresponding to the filter-holder bowl used.

Figure 2:
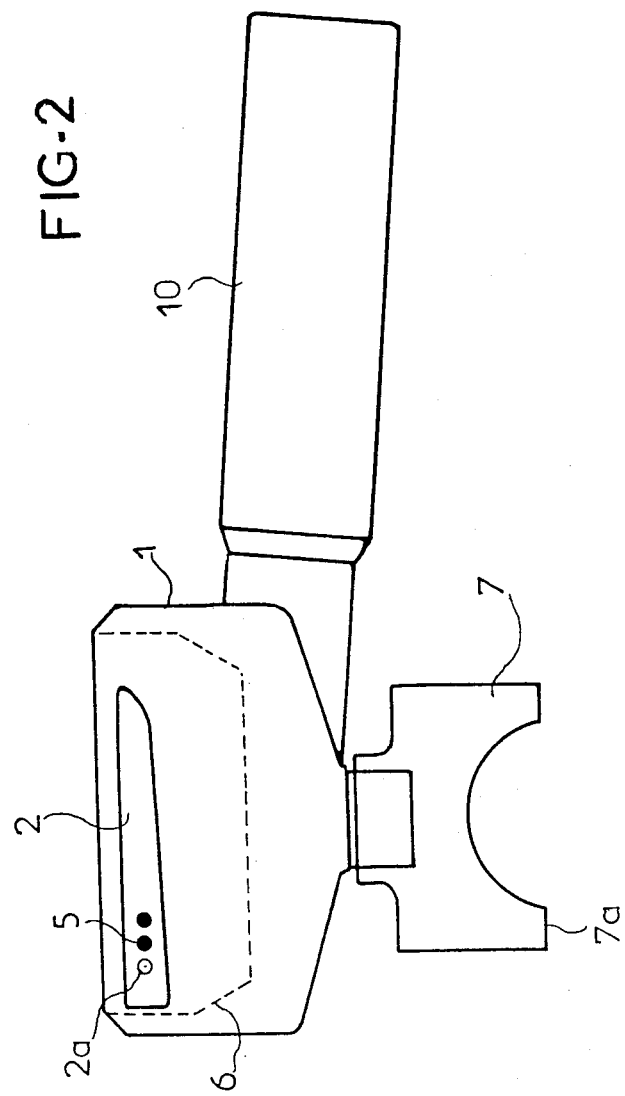
FIG. 2 shows the side view of a "2-cup" filter-holder bowl assembly according to the invention
Figure 3:
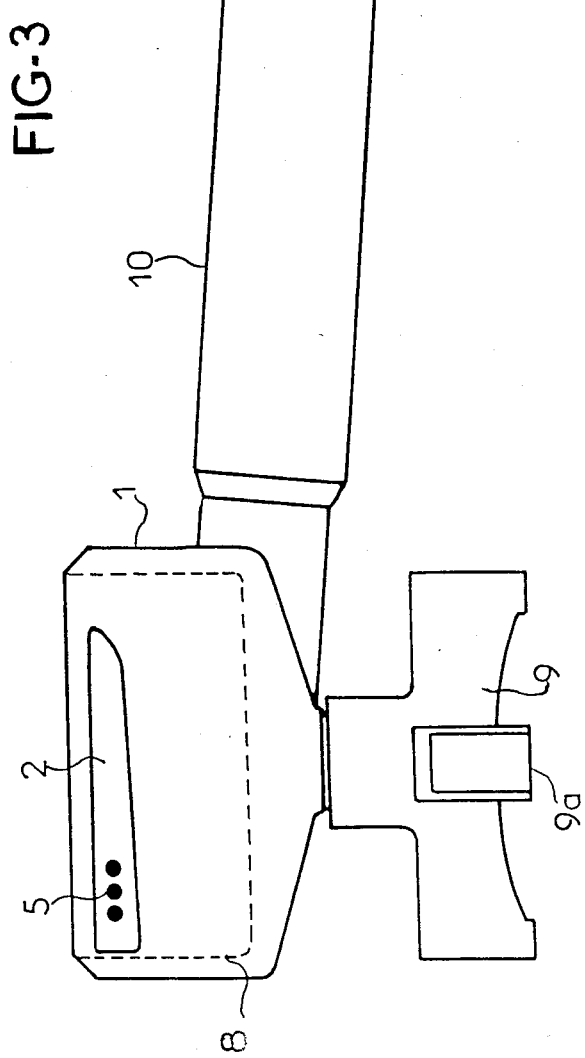
FIG. 3 shows the side view of a "3-cup" filter-holder bowl assembly according to the invention

Referring to FIGS. 1 to 3, it can be seen that ears 2 of filter-holder bowl 1 are fitted with 3 regularly spaced cylindrical, holes 2a, located in a transverse plane, in which are mounted 1, 2 or 3 magnetic elements consisting of magnets 5 according as distribution nozzle 4, 7 or 9 has one, two or three outlets 4a, 7a or 9a to simultaneously distribute coffee into one, two or three cups; each of filter-holder bowls 1 is equipped with a filter 3, 6 or 8 whose capacity corresponds to the number of cups.

Figure 4:
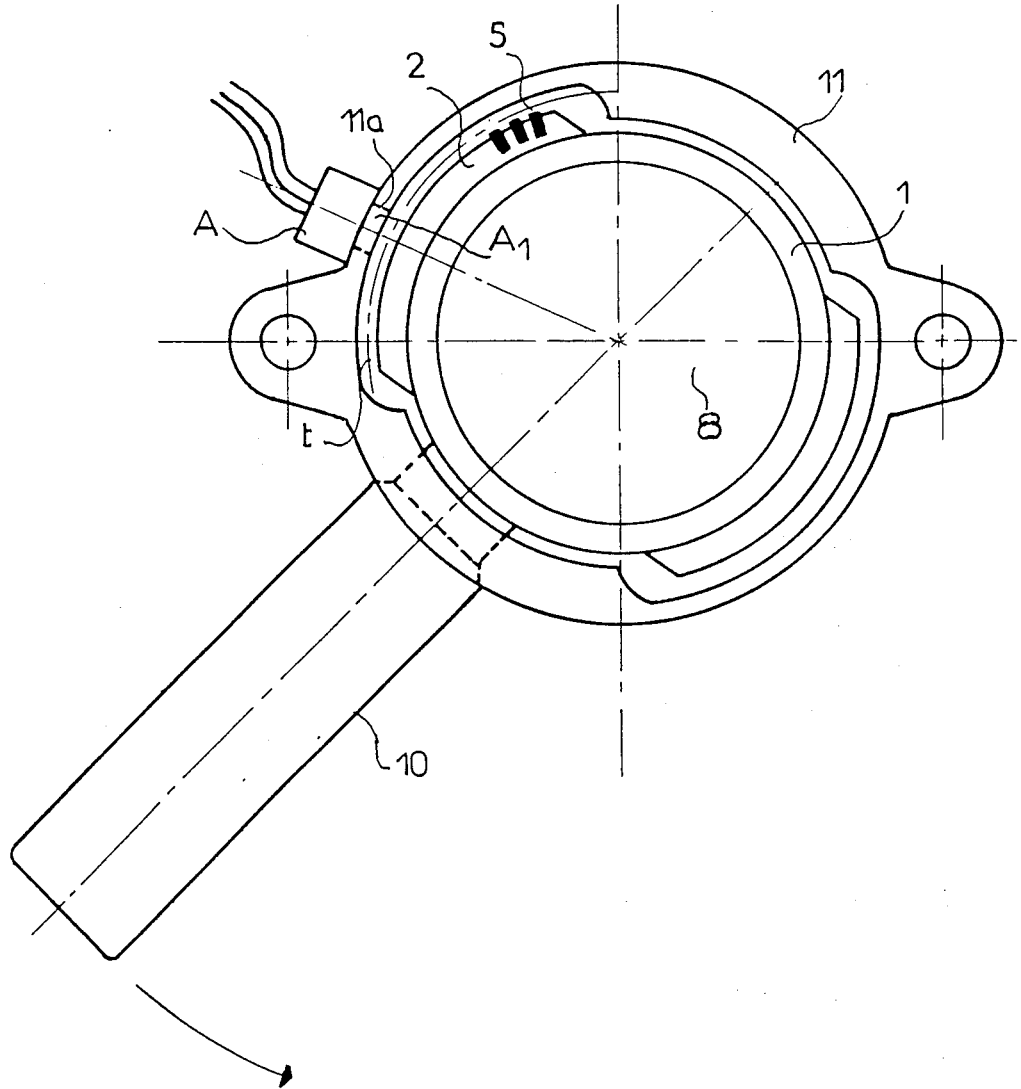
FIG. 4 shows the top view of the filter-holder bowl assembly positioned but not engaged in the bowl-holder equipped with the device according to the invention
Figure 5:
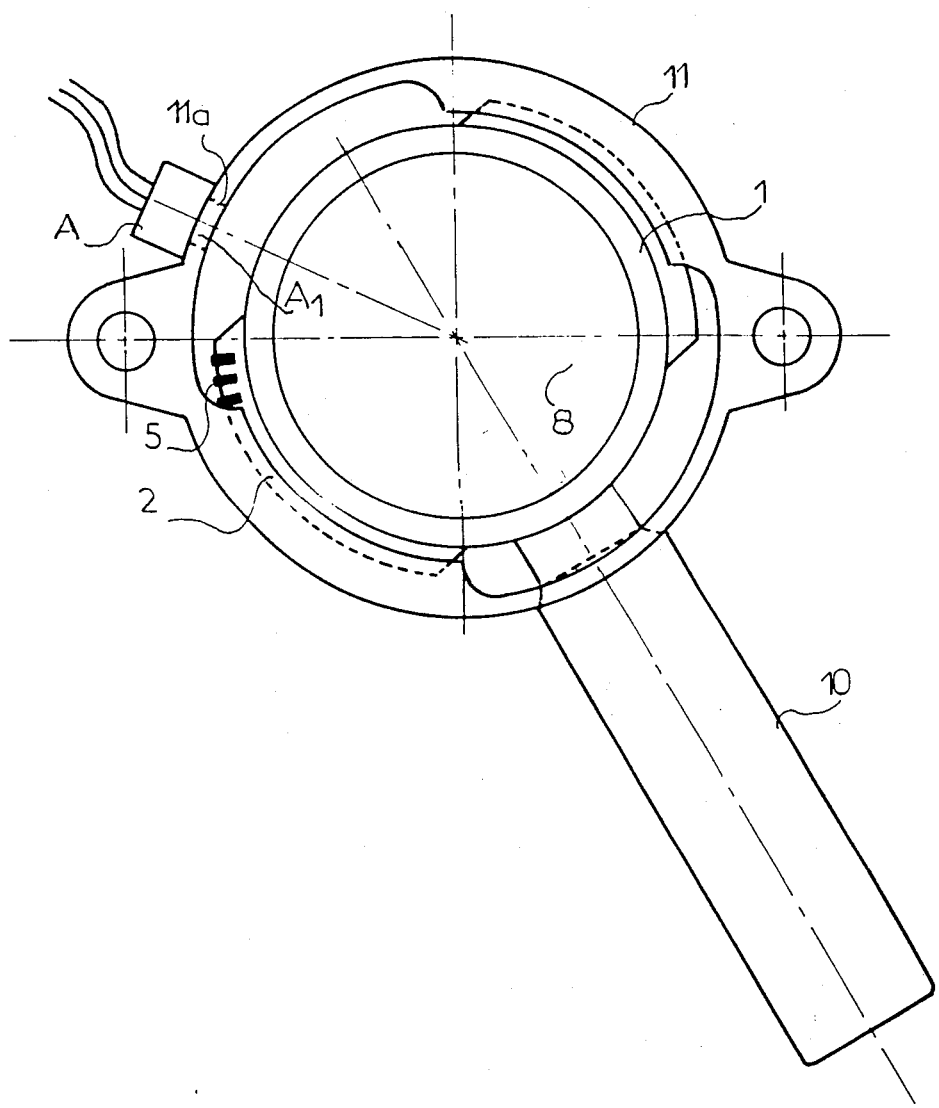
FIG. 5 shows the top view of the filter-holder bowl assembly engaged in the bowl-holder equipped with the device according to the invention
Figure 6:
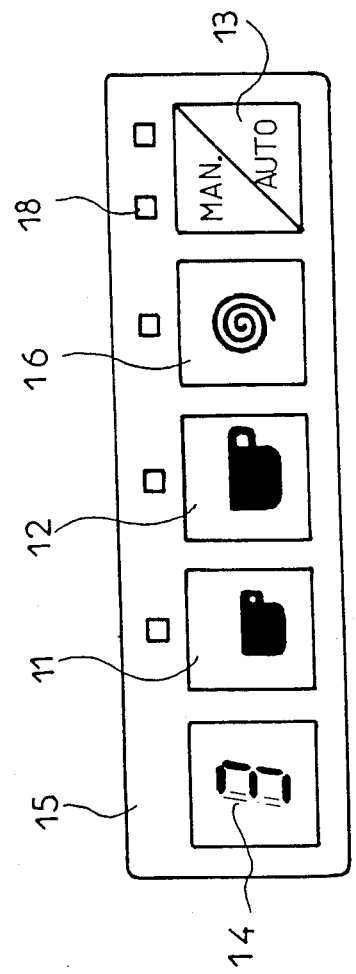
FIG. 6 shows the front view of the ergonomic control keypad of an expresso coffee machine equipped with the device according to the invention

Referring to FIGS. 4 and 5, it can be seen that bowl-holder 11 equipped with a Hall effect detector whose sensitive element A is housed in hole 11a drilled in the wall of said bowl-holder 11 in a plane corresponding to that in which are located holes 2a provided on the edge of one of ears 1 of filter-holder bowl 1 when said filter-holder bowl is engaged in bowl-holder 11, located radially at an angle such that it is scanned by magnet(s) 5 when filter-holder bowl 1 is moved from the introduction position shown in FIG. 4 to the end of engagement position shown in FIG. 5. Sensitive element $A_1$ of Hall effect detector A is thus located in the path t of magnet(s) 5. Hall effect detector A, sensitive to the variations in magnetic flux, generates a signal proportional to this variation which is used to count magnets 5 whose number, as specified above, corresponds to the capacity in cups of filter-holder bowl 1 engaged on the bowl-holder.

Figure 7:
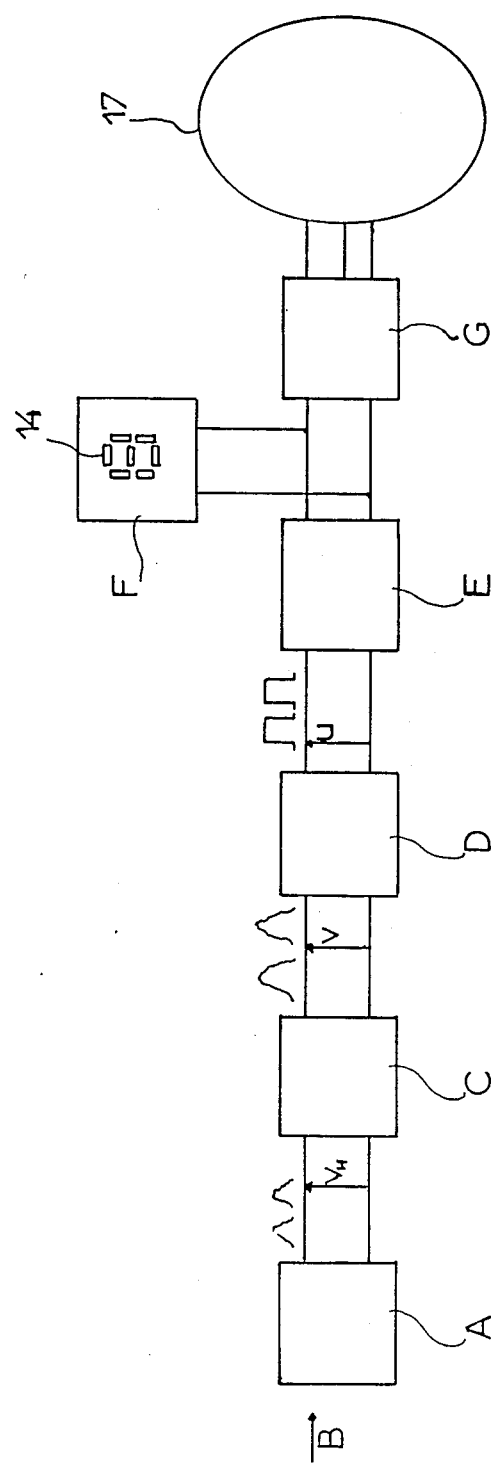
FIG. 7 shows the block diagram of the water metering device electronic control system.

Referring to FIG. 7, it can be seen that to obtain automatic output and display of the number of water doses and number of cups corresponding to the capacity of the filter-holder bowl and the desired coffee strength, Hall effect detector A is included in an electronic circuit connecting it to water dose dispenser 17.

This electronic circuit includes amplifier C which amplifies the voltage pulses V generated by Hall effect detector A after which these pulses are converted to square pulse signal by converter D so that said signals can be processed by counter E which provides visible display, by means by decoder F and electronic readout 14, of the number of cups corresponding to the filter-holder bowl engaged and controls, by means of comparator G, dispensing by dispenser 17 of the number of doses corresponding to the capacity of the filter-holder bowl engaged and the desired strength, since the number of doses can be modulated by action on small cup key 11 or large cup key 12 located on control keypad 15 also including electronic readout 14.

The device described as an example corresponds to an embodiment allowing automatic dispensing of the water doses, but it is easy to see that it can be used also, subject to a very simple adaptation, to control automatic dispensing of coffee doses by a coffee grinder, according to the capacity of the filter-holder bowl used, in combination with the coffee machine or separately.

The applications of the invention are obviously not restricted to the embodiments mentioned and developed above, since the detector and actuator used to obtain the same advantages may consist of infrared devices or other devices capable of generating electric signals the number of which corresponds to the capacity in cups of the filter-holder bowl engaged on the bowl-holder.

We claim:

1. Detection and display device for automatic service expresso coffee machine which automatically outputs and displays the number of ground coffee or water doses required for the desired infusion quantity, depending on the capacity of the filter-holder bowl engaged on the bowl-holder of the coffee grinder or coffee machine; automatic detection and display of the number of ground coffee or water doses according to the capacity of the filter-holder bowl are obtained by means of an actuator mounted on the filter-holder bowl and a detector mounted on the bowl-holder of the coffee grinder or coffee machine, characterized in that the actuator and detector form a system generating electric signals the number of which corresponds to the capacity in cups of the filter-holder bowl engaged on the bowl-holder, in that display of the number of cups corresponding to the capacity of the filter-holder bowl engaged on the bowl-holder is obtained by means of an electronic readout (14) and in that the number of water doses corresponding to the capacity of the filter-holder bowl engaged and the desired coffee strength is obtained by means of an electronic circuit controlled by strength selection keys (11 and 12) connecting the detector mounted on the bowl-holder to the water metering device (17).

2. Device as per claim 1, characterized in that the actuator-detector system generates electric signals the number of which corresponds to the capacity in cups of the filter-holder bowl engaged on the bowl-holder consists of bars traced on the edge of the filter-holder bowl and a bar code reader mounted on the bowl-holder or the coffee machine body.

3. Device as per claim 1, characterized in that the actuator-detector system generating electric signals the number of which corresponds to the capacity in cups of the filter-holder bowl engaged on the bowl-holder consists of a color pad mounted on the filter-holder bowl and a color detector mounted on the bowl-holder or the coffee machine body.

4. Device as per claim 1, characterized in that the actuator-detector system generating electric signals the number of which corresponds to the capacity in cups of the filter-holder bowl engaged on the bowl-holder consists of magnetic elements (5) mounted on the filter-holder bowl (1) and a Hall effect detector (A) mounted on the bowl-holder.

5. Device as per claim 4, characterized in that magnetic element(s) (5) mounted on filter-holder bowl (1) are inserted in one or more cavities (2a) provided on the edge of one of mounting ears (2) of filter-holder bowl (1).

6. Device as per claim 5, characterized in that the number of cavities (2a) and magnetic elements (5) mounted on filter-holder bowl (1) corresponds to the number of outlets of distribution nozzle (4, 7 or 9) of filter-holder bowl (1).

7. Device as per claim 4, characterized in that Hall effect detector (A) on bowl-holders (11) of the coffee grinder or coffee machine is located radially at such an angle and in such a position that it is scanned by magnetic element(s) (5) mounted on filter-holder bowls (1) when the filter-holder bowls are engaged.

8. Device as per claim 1, characterized in that the electronic circuit connecting detector (A) to water metering system (17) consists of amplifier (C), signal converter (D), counter (E), decoder (F), readout (14) and comparator (G).

9. Device as per claim 1, characterized in that control keypad (15) of the coffee machine includes electronic readout (14), the two strength selection keys (11 and 12), a continuous operation control key (16) and a manual or automatic operation key (13), all of which are surmounted by an operation indicator light (18).

* * * * *